June 26, 1956  J. F. LOEFFLER  2,751,902
ADJUSTABLE SURGICAL RETRACTOR
Filed June 15, 1955  3 Sheets-Sheet 1
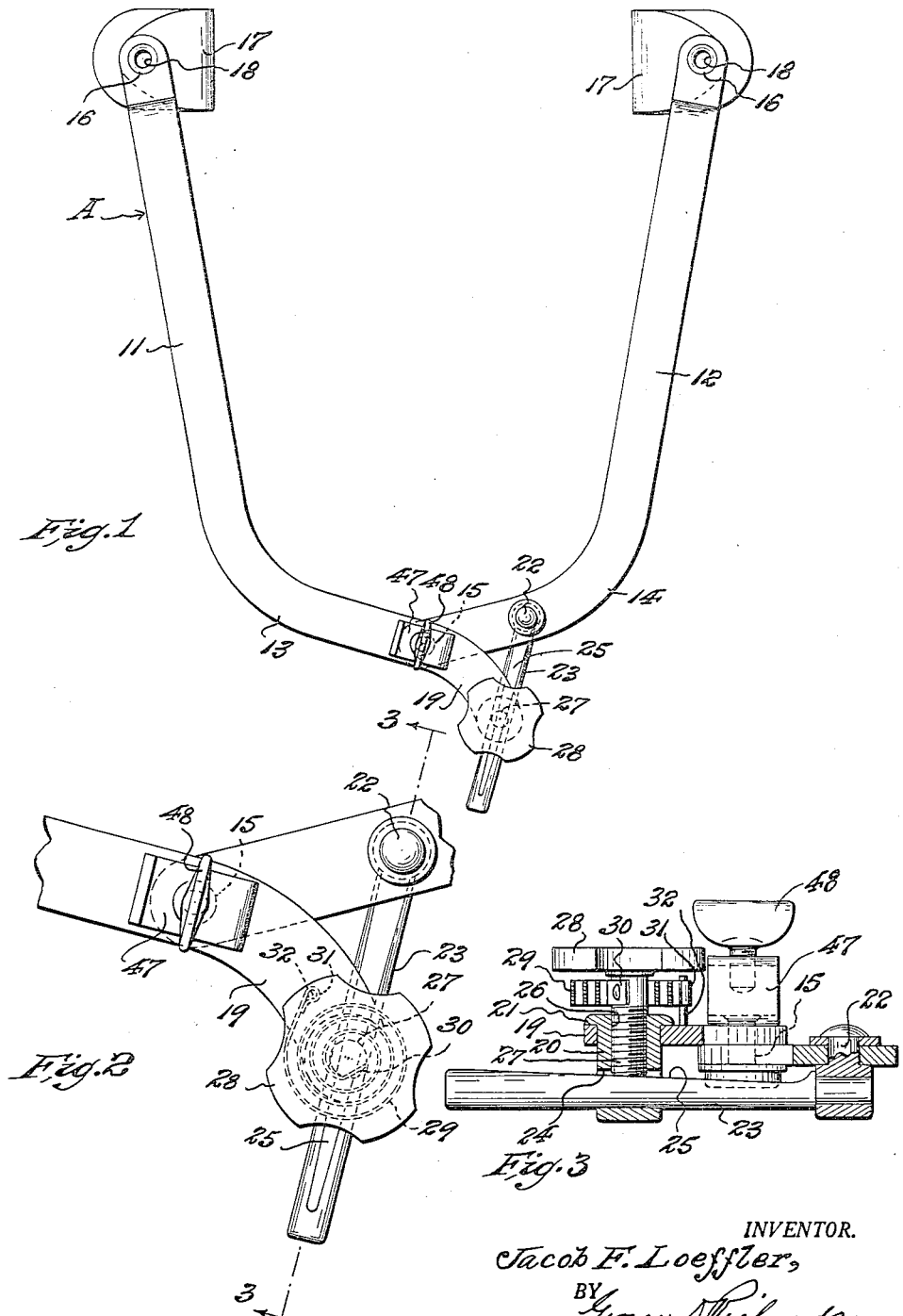
INVENTOR.
Jacob F. Loeffler,
BY George D. Richards
Attorney

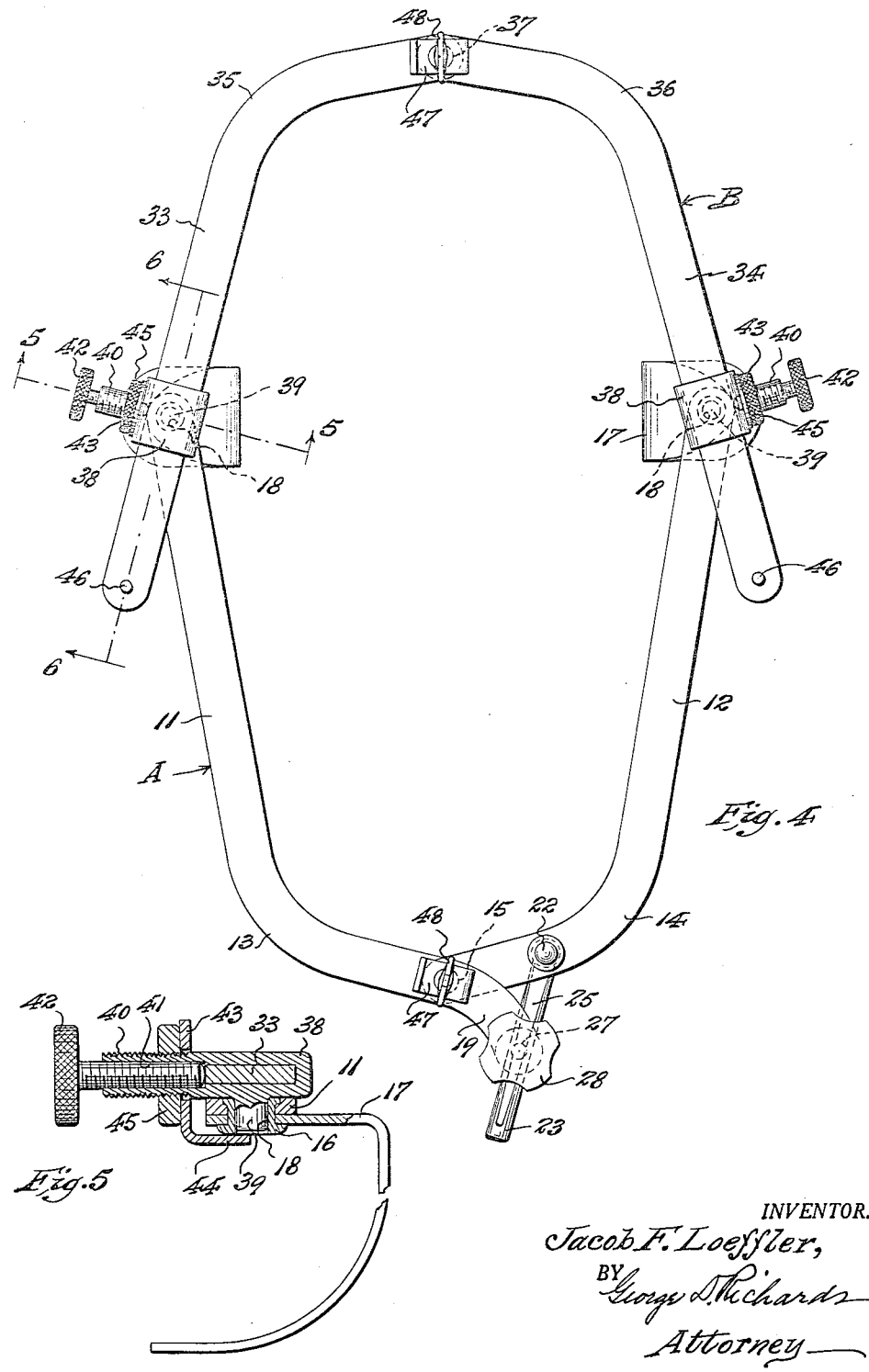

June 26, 1956  J. F. LOEFFLER  2,751,902
ADJUSTABLE SURGICAL RETRACTOR

Filed June 15, 1955  3 Sheets-Sheet 3

INVENTOR.
Jacob F. Loeffler,
BY George D. Richards
Attorney

United States Patent Office 2,751,902
Patented June 26, 1956

2,751,902
ADJUSTABLE SURGICAL RETRACTOR

Jacob F. Loeffler, West Point Pleasant, N. J.

Application June 15, 1955, Serial No. 515,593

7 Claims. (Cl. 128—20)

This invention relates to retractors for surgical use, especially in connection with performance of abdominal and pelvic surgery; and the invention has reference more particularly, to an improved incisional retractor adapted to engage the margins of an incision in an abdominal wall or other incised area, whereby to spread open and hold open the incision so as to give the operating surgeon unimpeded access to internal organs to be operated upon.

The invention has for an object to provide an improved surgical retractor which can be easily and quickly expanded to effect a desired span of incision spread, and including novel means for holding the retractor against collapse under tensional pressure exerted thereupon by the spread margins of the incision in which the retractor is engaged; said holding means being adapted to automatically adjust its holding effect according and in correspondence to any degree of expansion to which the retractor is moved, without necessity for locking manipulation of the holding means per se by the user; manipulation of said holding means being required only for release of the same from its holding effect.

This invention has for another object to provide a surgical retractor comprising a main retractor section equipped with retractor blades or fingers, and an auxiliary retractor section adapted to be adjustably connected to said main retractor section and its retractor blades or fingers, each said section being formed by pairs of pivotally connected frame bars, said main retractor section being adapted to be used alone for the spreading of comparatively small or short incisions, or in combination with the auxiliary retractor section for the spreading of comparatively large or long incisions; means being provided for attachment to said retractor sections of various forms of additional retractor blades or like devices when required.

This invention has for a further object to provide, in a surgical retractor comprising main and auxiliary retractor sections, each formed by pairs of pivotally connected frame bars, novel means for both pivotally connecting together the free end portions of corresponding frame bars thereof, and slidably supporting the frame bars of the auxiliary retractor section relative to the frame bars of the main retractor section, whereby to selectively predetermine the overall length of the surgical retractor formed thereby; said latter means being so related to the adjoined frame bars as to lie substantially in the horizontal plane of the surgical retractor, with but minimum projection thereof above the horizontal top face plane of the latter, whereby said means does not obstruct or impede free movements of the operating surgeon's hands and arms during operating procedure.

The above and other objects will be understood from a reading of the following description of this invention in connection with the accompanying drawings, which show illustrative embodiments thereof, in which drawings:

Fig. 1 is a plan view of the main section of the surgical retractor as used alone.

Fig. 2 is an enlarged fragmentary plan view showing the automatic holding means which retains the retractor in adjusted spreading relation to an incision with which the latter is engaged; and Fig. 3 is a longitudinal sectional view, taken on line 3—3 in Fig. 2.

Fig 4 is a plan view showing the main and auxiliary retractor sections as joined together for combined use.

Fig. 5 is an enlarged transverse vertical section, taken on line 5—5 in Fig. 4.

Figure 6:
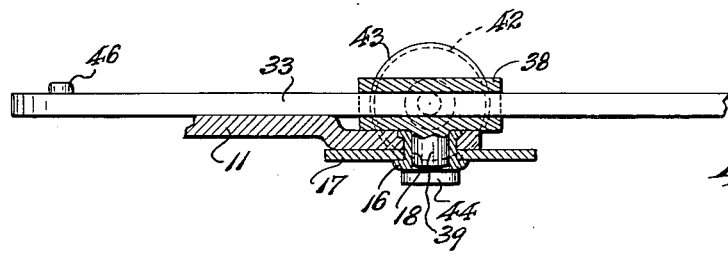
Fig. 6 is an enlarged longitudinal vertical section, taken on line 6—6 in Fig. 4.

In the drawings, wherein like characters of reference denote corresponding parts, Fig. 1 shows a retractor section or member A which, per se, is adapted to be used alone as a retractor device for spreading open small or short incisions, or to which may be joined an auxiliary retractor section or member B (see Fig. 4), to provide a retractor device suitable for spreading open comparatively large or long incisions. The retractor section or member A comprises a pair of frame bars 11 and 12, preferably formed with inwardly and laterally offset elbows 13 and 14. The inner or elbow ends are pivotally connected together by a pivot pin 15, so that the frame bars can be swung from and toward one another to expand or contract the retractor section or member A formed thereby. Pivotally connected, by a pivot stud 16, to the free end of each frame bar 11 and 12, to depend therefrom, is a retractor blade 17, that is preferably but not necessarily of hook-like shape as shown. These retractor blades 17 are free to swivel about the vertical axes of their pivoting studs 16, which axes are perpendicular to the horizontal plane of the retractor section or member. The pivot studs 16 are provided with upwardly open sockets 18, the purpose of which will be subsequently herein explained.

Means is provided for automatically locking the frame bars 11 and 12 against collapse from any spread position to which they are moved in use. The means for this purpose comprises an arm 19 that extends outwardly from the pivoted end of one of the frame bars (e. g. frame bar 11) as an integral part thereof. Mounted in the free end portion of said arm 19, in swiveling relation thereto about a perpendicular axis, is a knuckle member 20, having an annular flange 21 to seat upon the upper face of the arm 19, so that said knuckle member depends from the underside of said arm. Mounted in connection with the other frame bar (e. g. frame bar 12), in suitably spaced away relation to its pivotal connection with the first mentioned frame bar, is a pivoting stud 22 that depends from its underside. Affixed to said pivoting stud 22, for outward projection therefrom in a plane parallel to the frame bars, is a lock bar 23. This lock bar slidably extends through a transverse opening 24 with which the knuckle member 20 is provided. Said lock bar 23 is provided, on its upper side, with a longitudinal tapered face 25 angular to its axis, so as to form an inclined plane which descends downwardly and inwardly from its outer free end portion to its inner pivoted end. The knuckle member 20 is provided with an internally screw-threaded axial bore 26 entering downwardly therethrough so as to intersect its transverse opening 24. Threaded through said bore 26 is a lock screw 27 provided at its upper exterior end with a finger-piece or knob 28. Arranged between the finger piece or knob of the lock screw 27 and the knuckle member 20 is a spiral spring 29, of the clock spring type. The inner end 30 of said spring 29 is affixed to the shank of the lock screw 27, and the outer end 31 thereof is fastened to an anchor post 32 that upstands from the arm 19 of the frame bar 11. Said spiral spring 29 is under tension which causes the same to automatically exert a down turning thrust upon the lock screw, which moves the latter downward until stopped by abutment of its end against the inclined face 25 of the lock bar 23, whereby the same is constantly moved toward its engaged binding relation to the lock bar, when the arm 19 is swung inwardly by outward relative movement of the frame bars 11 and 12 to spread apart the retractor blades 17. It will thus be understood that the spring 29 will cause the lock screw 27 to automatically follow the descending plane of the tapered face 25 of the lock bar 23 as the frame bars 11 and 12 are spread apart, so that the upward inclination of said tapered face 25 of the lock bar 23 will constantly restrain outward movement of the arm 19, and thereby prevent inward collapse of the frame bars from any selected spread apart position to which the latter may be moved to attain a desired span of incision spread by the retractor in use. Such automatic locking of the retractor in selected incision spreading position is of great advantage, since very precise adjustment of spread can be effected merely by out swinging the frame bars 11 and 12, and maintenance of such selected spreading position is automatically assured, without risk of relaxation, as would be the case if manual locking were required. If manual locking were required, one person would have to spread apart and hold spread the frame bars 11 and 12 against relaxation, while another person would have to manipulate the locking means.

When it is desired to release the retractor for collapse and removal from an incision engaged thereby, the operator manually turns out the lock-screw 27 against the tension of the spring 29, thus allowing the lock bar 23 to freely move inwardly through the opening 24 of the knuckle member 20.

When the retractor section or member A is used alone, as for spreading apart the margins of a small or short incision, the retractor blades 17 are entered through the incision and respectively hooked over the opposite margins thereof, whereupon the frame bars 11 and 12 are swung outward to spread apart said retractor blades 17, so as to effect a desired span of incision opening.

If it is desired to spread open a large or long incision, the auxiliary retractor section or member B is coupled to the retractor section or member A, as shown in Fig. 4. The retractor section or member B also comprises a pair of frame bars 33 and 34, preferably formed with inwardly and laterally offset elbows 35 and 36. The inner or elbow ends are pivotally connected together by pivot stud 37, so that the frame bars 33 and 34 can be swung from and toward one another to expand or contract the retractor section or member B formed thereby. The free end portions of corresponding frame bars of the retractor sections or members A and B are adjustably and pivotally connected together, thus providing a retractor, of substantially oblong shape, which is capable of expansion and contraction, both laterally and longitudinally. To this end, the frame bars 33 and 34 of the retractor section or member B are respectively provided with endwise open coupler members 38, through which said frame bars slidably extend. Projecting downwardly from the undersides of the coupler members 38, as unitary parts thereof, are pivot pins 39 which can be removably engaged in the sockets 18 of the underlying frame bars 11 and 12 of the retractor section or member A, whereby to pivotally connect said frame bars 33 and 34 respectively with said underlying frame bars 11 and 12. Projecting laterally and horizontally outward from outer sides of the respective coupler members 38 are externally screwthreaded studs 40 having internally screwthreaded bores 41. Threaded through the bores 41 of said studs 40 are set screws 42 which, when turned home, bind said frame bars 33 and 34 in longitudinally adjusted relation to said underlying frame bars 11 and 12. In order to prevent accidental separation of said frame bars 33 and 34 from their pivotally connected relation to said underlying frame bars 11 and 12, releasable perforate retainer clips 43 are engaged over the studs 40 to abut outer sides of the coupler members 38. Said retainer clips 43 are provided with inwardly projecting angular stop tongues 44 which, when the clips are operatively positioned, engage under the underlying frame bars 11 and 12, thereby preventing upward withdrawing displacement of said pivot pins 39 from the sockets 18. The clips 43 are releasably secured in their operative positions by lock nuts 45 which are threaded onto the studs 40. It will be noted that the above described coupler structures lie parallel to the horizontal plane of the joined retractor sections or members A and B, so that, when the retractor provided by the latter is in use, said coupler structures involve but minimum projection above the top face plane of the retractor, and consequently do not objectionably obstruct or impede free movements of the operating surgeon's hands and arms during operating procedure.

When the operatively joined retractor sections or members A and B are used for spreading apart the margins of a large or long incision, relative longitudinal adjustment of the joined retractor sections or members, to predetermine a desired overall length of the retractor formed thereby, can be attained by loosening the set screws 42, and then sliding the corresponding frame bars of said retractor sections or members toward or from one another. After such adjustment is made, said frame bars can be secured against relative longitudinal displacement by turning home the set screws 42. The ends of the frame bars 33 and 34 are provided with upstanding stop lugs 46 which, by abutment against ends of the coupler members 38, prevent accidental longitudinal separation of said frame bars from the latter.

Having been adjusted for overall length, the retractor, formed by the joined retractor sections or members A and B, can be applied to an incision to be served thereby by entering the retractor blades 17 through said incision so as to shook over opposite margins thereof, whereupon the pivotally joined frame bars 11 and 33 and 12 and 34 can be swung outward to spread apart the retractor blades 17 to effect a desired span of incision opening. The automatic locking means of the retractor section or member A will then operate, in the manner hereinabove described, to hold the retractor against collapse under tensional pressure exerted thereupon by the spread margins of the incision with which the retractor is engaged.

The retractor sections or members A and B are preferably respectively provided at their hinged ends with transversely channeled coupler devices 47 equipped with set screws 48 to serve as means for detachably connecting to said retractor sections or members, when required, additional retractor blades or like devices (not shown). It will also be understood that other additional retractor blades or like devices can be detachably mounted on the bodies of the frame bars in any suitable manner already known to the art.

Figure 7:
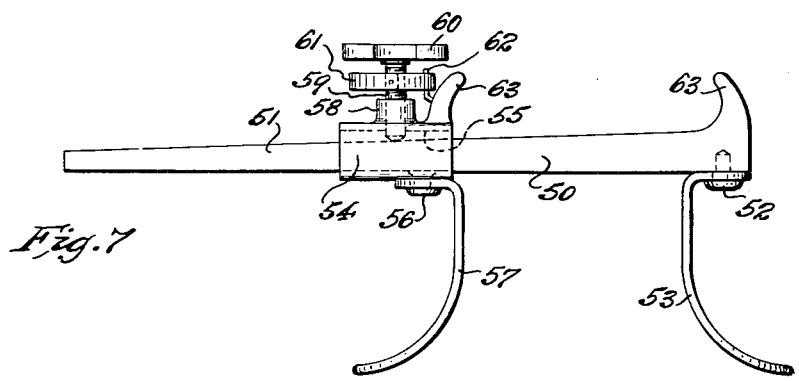
Fig. 7 is a side elevational view of a simplified form of surgical retractor equipped with the novel automatic spread holding means according to this invention.
Figure 8:
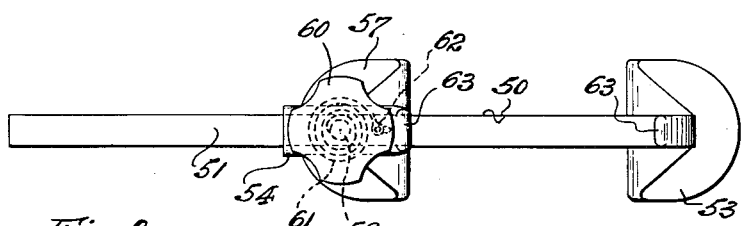
Fig. 8 is a top plan view of the same.

Referring to Figs. 7 and 8, a modified and very simple form of surgical retractor is shown therein, which however includes the automatic or self-locking means, according to this invention, for holding the same against collapse from a desired incision spreading adjustment. This simplified form of retractor comprises a longitudinally tapered carrier bar 50 having a downwardly and outwardly inclined top face 51. Pivotally connected, by a pivot stud 52, with one end of said carrier bar 50, to depend therefrom, is a retractor blade 53, which is free to swivel about the vertical axis of its pivoting stud. Longitudinally movable along the carrier bar 50 is an endwise open carrier member 54, through the passage 55 of which said carrier bar extends. Pivotally connected, by a pivot stud 56, to the underside of the carrier member 54, to depend therefrom, is a second retractor blade 57, which is also free to swivel about the vertical axis of its pivoting stud. Projecting upwardly from the top side of the carrier member 54, is an internally screwthreaded boss 58, the bore of which intersects the passage 55 of said carrier member. Threaded downwardly through the bore of said boss 58 is a lockscrew 59, which is provided at its upper exterior end with a finger piece or knob 60. Arranged between the finger piece or knob 60 of the lockscrew 59 and the boss 58 is a spiral spring 61, of the clock spring type. The inner end of this spring 61 is affixed to the lockscrew, and its outer end is anchored to an anchor post 62 which is carried by the carrier member 54. The spring 61 is under tension which causes the same to automatically exert a down turning thrust upon the lockscrew, whereby to move the latter into stopped engagement with the inclined top face 51 of the carrier bar 50. Both the carrier bar 50 and carrier member 54 are provided with suitably shaped finger pieces 63, by which these can be relatively moved in use. In the use of this simplified form of retractor, the lock-screw 59 is manually out turned so that the carrier member 54 can be inwardly moved along the carrier bar 50, whereby to bring the retractor blades 57 and 53 together. This having been done, said retractor blades are entered through an incision to engage opposite margins thereof, whereupon the carrier member 54 is moved outwardly along the carrier bar 50 to spread apart said retractor blades so as to effect a desired span of incision opening. During the latter operation, the lockscrew 59 will be automatically in turned by the spring 61 to engage the inclined top face 51 of the carrier base 50, so as to hold the retractor blades against relaxation from their spaced apart incision spreading relation, all in the manner and with the advantages already hereinabove described.

Having now described my invention, I claim:

1. A surgical retractor comprising relatively movable members for supporting retractor blades adapted to be engaged with opposite margins of an incision, whereby to spread and hold open said incision, one said member including a longitudinally tapered portion providing an inclined plane face, the other member including a lockscrew opposed to said inclined plane face, and a spiral spring having its inner end affixed to said lockscrew and its outer end anchored to said last mentioned member, said spring being adapted to automatically rotate said lockscrew in direction to constantly engage said inclined plane face, said face being inclined in direction to oppose, when engaged by said lockscrew, relaxation of the retractor blades from their incision spreading positions.

2. A surgical retractor comprising pivotally joined relatively movable members for supporting retractor blades adapted to be engaged with opposite margins of an incision, whereby to spread and hold open said incision, and means for holding said members in laterally expanded relation comprising an outwardly extending arm projecting from the pivoted end of one member, a rotatable knuckle member mounted on said arm, a lock bar pivotally connected with the other member to extend therefrom slidably through said knuckle member, said lock bar being tapered from its outer end toward its inner end to provide an inclined plane top face, a lockscrew threaded axially through said knuckle member to oppose said lock bar, and a spiral spring having its inner end affixed to said lockscrew and its outer end anchored to said arm, said spring being adapted to automatically rotate the lockscrew in direction to constantly engage said inclined plane face of the lock bar.

3. A surgical retractor formed by oppositely extending sections, each section comprising a pair of frame bars pivotally joined at their outer ends, retractor blades carried by the frame bars of at least one said retractor section, means for coupling the inner end portions of corresponding frame bars of respective retractor sections in lapped meeting relation subject to rotative pivotal and longitudinal movements, said coupling means comprising an endwise open coupler member through which one of said frame bars slidably extends, said coupler member having means to detachably pivotally connect the same with the other frame bar, said coupler member having an internally screwthreaded stud extending outwardly therefrom in the plane thereof, a setscrew threaded through said stud to engage and releasable secure the frame bar extending through said coupler member in longitudinally adjusted relation thereto and to the other frame bar, and means cooperative with the pivotally joined outer ends of the frame bars of one said retractor sections for holding the retractor in selected laterally expanded condition.

4. A surgical retractor formed by oppositely extending sections, each section comprising a pair of frame bars pivotally joined at their outer ends, retractor blades carried by the frame bars of at least one said retractor section, means for coupling the inner end portions of corresponding frame bars of respective retractor sections in lapped meeting relation subject to relative pivotal and longitudinal movements, said coupling means comprising an endwise open coupler member through which one of said frame bars slidably extends, said coupler member having means to detachably pivotally connect the same with the other frame bar, said coupler member having an internally screw-threaded stud extending outwardly therefrom in the plane thereof, a set-screw threaded through said stud to engage and releaseably secure the frame bar extending through said coupler member in longitudinally adjusted relation thereto and to the other frame bar, and means cooperative with the pivotally joined outer ends of the frame bars of one of said retractor sections for holding the retractor in selected laterally expanded condition, said latter means comprising an outwardly extending arm projecting from the pivoted end of one of said frame bars, a rotatable knuckle member mounted on said arm, a lock bar pivotally connected with the other said frame bar to extend therefrom slidably through said knuckle member, said lock bar being tapered from its outer end toward its inner end to provide an inclined plane top face, a lockscrew threaded axially through said knuckle member to oppose said lock bar, and a spiral spring having its inner end affixed to said lock screw and its outer end anchored to said arm, said spring being adapted to automatically rotate the lockscrew in direction to constantly engage said inclined plane face of the lock bar.

5. A surgical retractor formed by oppositely extending sections, each section comprising a pair of frame bars pivotally joined at their outer ends, retractor blades carried by the frame bars of at least one said retractor section, means for coupling the inner end portions of corresponding frame bars of respective retractor sections in lapped meeting relation subject to relative pivotal and longitudinal movements, said coupling means comprising an endwise open coupler member through which one of said frame bars slidably extends, a pivot pin projecting downwardly from the underside of said coupler member, the other said frame bar having an upwardly open socket to detachably receive said pivot pin, said coupler member having an externally screwthreaded stud extending outwardly therefrom in the plane thereof, said stud having an internally screwthreaded bore, a setscrew threaded through said bore to engage and releaseably secure the frame bar extending through said coupler member in longitudinally adjusted relation thereto and to the other frame bar, a keeper clip engaged over said stud and having an angular stud tongue to engage under said other frame bar to retain said pivot pin in the socket of the latter, and a lock nut threaded on said stud to releaseably hold said keeper clip in place, and means cooperative with the pivotally joined outer ends of the frame bars of one of said retractor sections for holding the retractor in selected laterally expanded condition.

6. A surgical retractor formed by oppositely extending sections, each section comprising a pair of frame bars pivotally joined at their outer ends, retractor blades carried by the frame bars of at least one said retractor section, means for coupling the inner end portions of corresponding frame bars of respective retractor sections in lapped meeting relation subject to relative pivotal and longitudinal movements, said coupling means comprising an endwise open coupler member through which one of said frame bars slidably extends, a pivot pin projecting downwardly from the underside of said coupler member, the other said frame bar having an upwardly open socket to detachably receive said pivot pin, said coupler member having an externally screwthreaded stud extending outwardly therefrom in the plane thereof, said stud having an internally screwthreaded bore, a setscrew threaded through said bore to engage and releaseably secure the frame bar extending through said coupler member in longitudinally adjusted relation thereto and to the other frame bar, a keeper clip engaged over said stud and having an angular stop tongue to engage under said other frame bar to retain said pivot pin in the socket of the latter, and a lock nut threaded on said stud to releaseably hold said keeper clip in place, and means cooperative with the pivotally joined outer ends of the frame bars of one of said retractor sections for holding the retractor in selected laterally expanded condition, said latter means comprising an outwardly extending arm projecting from the pivoted end of one of said frame bars, a rotatable knuckle member mounted on said arm, a lock bar pivotally connected with the other said frame bar to extend therefrom slidably through said knuckle member, said lock bar being tapered from its outer end toward its inner end to provide an inclined plane top face, a lock screw threaded axially through said knuckle member to oppose said lock bar, and a spiral spring having its inner end affixed to said lock screw and its outer end anchored to said arm, said spring being adapted to automatically rotate the lock screw in direction to constantly engage said inclined plane face of the lock bar.

7. A surgical retractor comprising a tapered carrier bar providing an inclined plane top face downwardly and outwardly descending from its butt end, a retractor blade dependent from the butt end of said carrier bar in swiveling connection therewith, a carrier member through which said carrier bar extends whereby the former is movable along the latter, a second retractor blade dependent from said carrier member in swiveling connection therewith, a lockscrew threaded through said carrier member in opposed relation to the inclined plane top face of the carrier bar, and a spiral spring having its inner end affixed to said lockscrew and its outer end anchored to said carrier member, said spring being adapted to automatically rotate the lock screw in direction to constantly engage said inclined plane top face of the carrier member.

No references cited.